US009284088B2

(12) United States Patent  
Humphries et al.

(10) Patent No.: US 9,284,088 B2  
(45) Date of Patent: Mar. 15, 2016

(54) THERMAL CONTAINER, LINER THEREFOR, AND LINER FORMING DIES

(75) Inventors: Gary W. Humphries, Dartmouth (CA); Alan W. McKinnon, Dartmouth (CA)

(73) Assignee: FRESH BAILIWICK INC., Dartmouth, NS (CA)

( * ) Notice: Subject to any disclaimer, the term of this patent is extended or adjusted under 35 U.S.C. 154(b) by 918 days.

(21) Appl. No.: 13/390,301

(22) PCT Filed: Aug. 14, 2009

(86) PCT No.: PCT/CA2009/001131  
§ 371 (c)(1), (2), (4) Date: Apr. 17, 2012

(87) PCT Pub. No.: WO2011/017793  
PCT Pub. Date: Feb. 17, 2011

(65) Prior Publication Data  
US 2012/0193365 A1 Aug. 2, 2012

(51) Int. Cl.  
*B65D 81/38* (2006.01)  
*B29C 53/40* (2006.01)  
(Continued)

(52) U.S. Cl.  
CPC .............. *B65D 5/244* (2013.01); *B29C 53/063* (2013.01); *B31B 1/25* (2013.01); *B31B 7/00* (2013.01);  
(Continued)

(58) Field of Classification Search  
CPC ........... B65D 81/3858; B65D 81/3897; Y10T 428/24777; B31F 1/2827  
USPC ........................ 229/103.11, 117.27; 425/460; 220/592.26  
See application file for complete search history.

(56) References Cited

U.S. PATENT DOCUMENTS

| 348,548 A | 9/1886 | Crump |
| 1,691,178 A | 11/1928 | Beaman |

(Continued)

FOREIGN PATENT DOCUMENTS

| CA | 985236 | 3/1976 |
| CA | 2347777 A1 | 6/2000 |

(Continued)

OTHER PUBLICATIONS

International Search Report of PCT/CA2009/001131 dated Jan. 7, 2010.

*Primary Examiner* — Christopher Demeree  
(74) *Attorney, Agent, or Firm* — Sutherland Asbill & Brennan LLP (57) ABSTRACT

A thermal insulating liner for a container has a bottom panel, a pair of opposed end panels, a first side panel and an opposed second side panel. A first flap is hinged to the first side panel at a first hinge line and a second flap is hinged to the said second side panel at a second hinge line. The first flap and second flap are sized so that they are moveable between an open position whereat the first flap is spaced from said second flap and a folded position whereat a side margin of the first flap which extends along a side edge of the first flap opposite the first hinge line overlaps with a side margin of the second flap which extends along a side edge of the second flap opposite the second hinge line. Each flap comprises an outer sheet and an inner sheet spaced by a core with an innermost layer of the inner sheet comprising a metal foil layer. Each flap has a first thickness outside its side margin and a second, reduced, thickness, within its side margin. A thermal container may contain such a thermal insulating liner. A pair of dies can form a liner for a thermal container. A bottom a bottom die half has a bottom die pair of raised rectangular blocks and a top die half has a top die pair of raised rectangular blocks sized and positioned so as to register with the bottom die pair of rectangular blocks when the dies are brought together in use. The bottom die half has two spaced creasing rules between the bottom die pair of raised rectangular blocks and the top die half has two spaced creasing rules between the top die pair of raised rectangular blocks. The top spaced creasing rules are positioned so as to register with the bottom die spaced creasing rules when the dies are brought together in use.

18 Claims, 11 Drawing Sheets

(51) Int. Cl.
  *B65D 5/24* (2006.01)
  *B29C 53/06* (2006.01)
  *B31B 1/25* (2006.01)
  *B31B 7/00* (2006.01)
  *B65D 5/56* (2006.01)
  *B29L 9/00* (2006.01)

(52) U.S. Cl.
  CPC ............ *B65D 5/566* (2013.01); *B65D 81/3823* (2013.01); *B65D 81/3858* (2013.01); *B29L 2009/00* (2013.01); *B31B 2201/252* (2013.01); *B31B 2217/0069* (2013.01)

(56) References Cited

U.S. PATENT DOCUMENTS

| | | | |
|---|---|---|---|
| 1,715,814 A | | 6/1929 | Brown |
| 1,928,660 A | * | 10/1933 | Boeye ...................... 229/120.04 |
| 2,301,657 A | | 11/1942 | Hlavaty |
| 2,523,145 A | | 9/1950 | Robinson |
| 2,860,555 A | | 11/1958 | Williamson |
| 3,124,292 A | | 3/1964 | Stegner |
| 3,160,307 A | | 12/1964 | Morrison |
| 3,669,340 A | | 6/1972 | Kinney |
| 3,880,341 A | * | 4/1975 | Bamburg et al. ......... 229/122.32 |
| 4,928,847 A | | 5/1990 | Hollander et al. |
| 5,000,372 A | | 3/1991 | Hollander et al. |
| 5,050,794 A | | 9/1991 | Wischusen, III |
| 5,102,004 A | | 4/1992 | Hollander et al. |
| 5,111,957 A | | 5/1992 | Hollander et al. |
| 5,201,868 A | | 4/1993 | Johnson |
| 5,230,941 A | | 7/1993 | Hollander et al. |
| 5,314,087 A | | 5/1994 | Shea |
| 5,429,264 A | | 7/1995 | Hollander et al. |
| 5,492,267 A | | 2/1996 | Hollander et al. |
| 6,513,703 B2 | * | 2/2003 | Becker .................... 229/103.11 |
| 7,140,773 B2 | | 11/2006 | Becker et al. |
| 7,226,405 B2 | | 6/2007 | Letherer |
| 7,975,905 B2 | | 7/2011 | Humphries et al. |
| 2010/0006630 A1 | * | 1/2010 | Humphries et al. ..... 229/117.27 |
| 2012/0193365 A1 | | 8/2012 | Humphries et al. |

FOREIGN PATENT DOCUMENTS

| | | |
|---|---|---|
| WO | 8703558 A1 | 6/1987 |
| WO | 0076861 | 12/2000 |

* cited by examiner

THERMAL CONTAINER, LINER THEREFOR, AND LINER FORMING DIES

CROSS-REFERENCE TO RELATED APPLICATIONS

This application is the national stage of International Application No. PCT/CA2009/001131, filed Aug. 14, 2009, which is incorporated by reference herein.

BACKGROUND

This invention relates to a thermal container, thermal insulating liners for such a container, and dies for making the thermal insulating liners.

Perishable goods may be packed in containers for shipping that utilize materials such as waxed corrugate and expanded polystyrene (STYROFOAM™). A refrigerant may be placed in the container with the goods. For example, it is known to pack fresh fish in a bag, surround the bag with a frozen Gel-Pack or ice, and place the bag and refrigerant in a corrugated container lined with polystyrene sheets as insulation. While such a thermally insulated container will keep the container contents acceptably refrigerated for a period of time, shipping times may exceed this time period. Further, expanded polystyrene gives rise to a health risk as styrene can leach from the material. Moreover, expanded polystyrene poses environmental concerns: it is a problem in landfills and has been banned from landfills in a number of cities and, being petroleum based, it is not a sustainable product.

U.S. Pat. Nos. 5,000,372 and 5,111,957 attempt to improve the insulating properties of a container by using panels formed of a honeycomb material covered by aluminum foil. However, the described containers are susceptible to leaking and there also remains a need for a thermal container which maintains its contents in a refrigerated state for a longer time period.

SUMMARY OF INVENTION

A thermal insulating liner for a container has a bottom panel, a pair of opposed end panels, a first side panel and an opposed second side panel. A first flap is hinged to the first side panel at a first hinge line and a second flap is hinged to the said second side panel at a second hinge line. The first flap and second flap are sized so that they are moveable between an open position whereat the first flap is spaced from said second flap and a folded position whereat a side margin of the first flap which extends along a side edge of the first flap opposite the first hinge line overlaps with a side margin of the second flap which extends along a side edge of the second flap opposite the second hinge line. Each flap comprises an outer sheet and an inner sheet spaced by a core with an innermost layer of the inner sheet comprising a metal foil layer. Each flap has a first thickness outside its side margin and a second, reduced, thickness, within its side margin.

In another aspect, a thermal container is provided which includes the thermal insulating liner.

In another aspect, there is provided a pair of dies for forming a liner for a thermal container. A bottom die half has a bottom die pair of raised rectangular blocks and a top die half has a top die pair of raised rectangular blocks sized and positioned so as to register with the bottom die pair of rectangular blocks when the dies are brought together in use. The bottom die half has two spaced creasing rules between the bottom die pair of raised rectangular blocks and the top die half has two spaced creasing rules between the top die pair of raised rectangular blocks. The top spaced creasing rules are positioned so as to register with the bottom die spaced creasing rules when the dies are brought together in use.

Other features and advantages will become apparent from the following description in conjunction with the drawings.

BRIEF DESCRIPTION OF THE DRAWINGS

In the figures which illustrate example embodiments of the invention.

DETAILED DESCRIPTION

Figure 1:
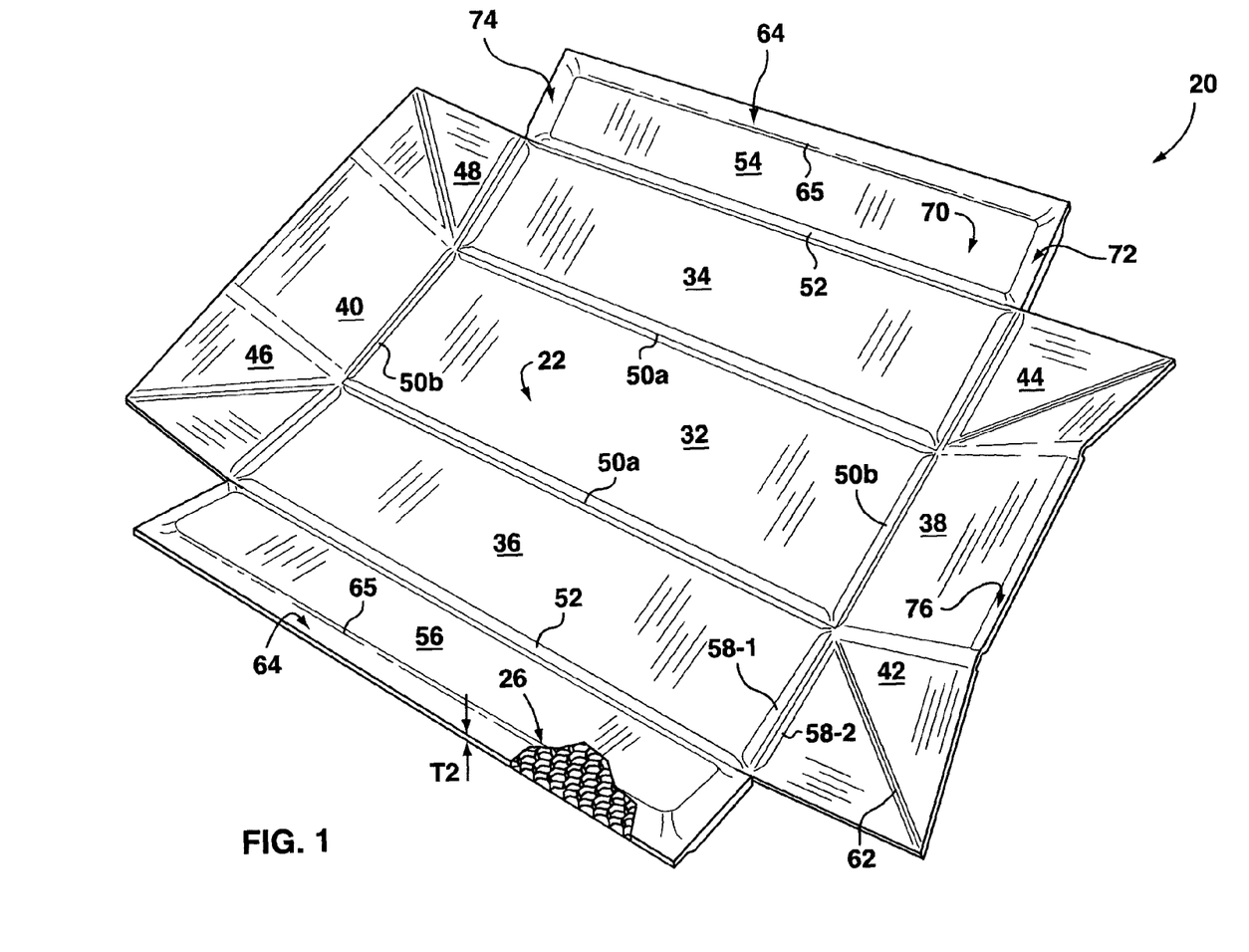
FIG. 1 is a partially cut away top perspective view of a liner blank made in accordance with this invention.
Figure 2:
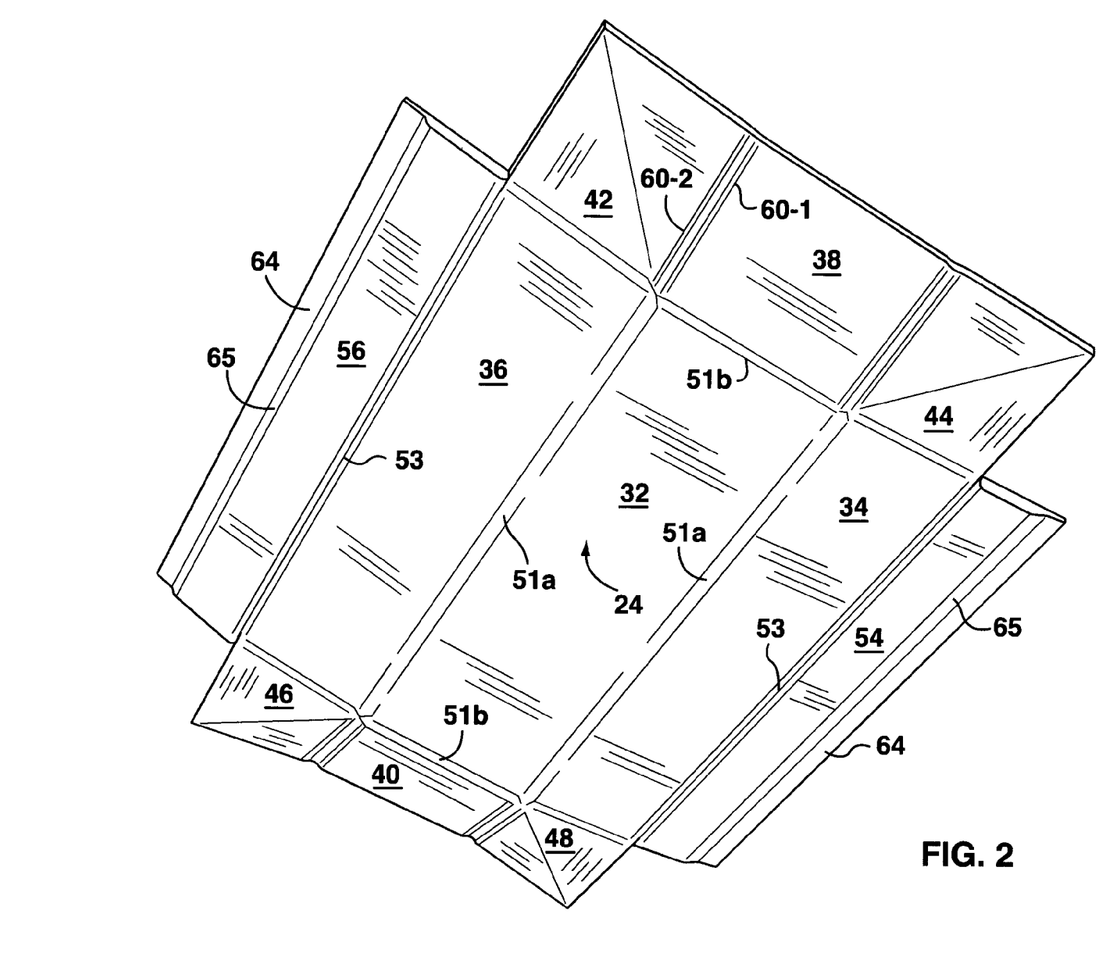
FIG. 2 is a bottom perspective view of the liner blank of FIG. 1.

Turning to FIGS. 1 and 2, an insulating liner blank 20 is composed of a top sheet 22, a bottom sheet 24, and a core 26. The top and bottom sheets have an exterior metal foil layer laminated to an interior plastic substrate, such as a polypropylene, polyethylene or polyester substrate. The plastic substrate is glued to Kraft liner board paper. The core 26 is a series of Kraft paper walls extending between the top 22 and bottom 24 sheets forming honeycomb-shaped cells. When the liner blank of FIGS. 1 and 2 is erected into the liner 80 illustrated in FIG. 4, the top sheet 22 of the liner blank becomes an inner sheet of the liner and the bottom sheet 24 of the liner blank becomes an outer sheet of the liner.

The liner has a bottom panel 32, side panels 34, 36, medial end panels 38, 40 between outer end panels 42, 44, 46, 48, with flaps 54, 56 extending from the side panels 34, 36, respectively. The bottom panel is separated from the side panels by interior crease lines 50a, which is to say, crease lines that extend into the liner from the interior sheet 22 and, as well, by exterior crease lines 51a, which is to say, crease lines that extend into the liner from the exterior sheet 24. The bottom panel is separated from the medial end panels 38, 40 by interior crease lines 50b and exterior crease lines 51b. The flaps are separated from the side panels by interior crease lines 52 (which extend into the liner from the interior sheet 22) and, as well, by exterior crease lines 53 (which extend into the liner from the exterior sheet 24). The exterior crease lines 51a, 51b, 53 are aligned with the interior crease lines 50a, 50b, 52.

Each outer end panel is separated from a side panel by a pair of parallel interior crease lines 58-1, 58-2. Each crease line 58-1 is substantially aligned with a crease line 50b. Each crease line 58-2 extends in one of the outer end panels. Each outer end panel is separated from a medial end panel by a pair of parallel exterior crease lines 60-1, 60-2. Each crease line 60-1 is substantially aligned with a crease line 50a between the bottom panel 32 and a side panel 34, 36. The parallel pairs of crease lines 58-1, 58-2 and 60-1, 60-2 may be spaced by approximately the thickness of the liner blank 20. Diagonal interior crease lines 62 extend from the point where the side panel hinge lines 58-1 and the medial end panel hinge lines 60-1 meet.

Figure 9:
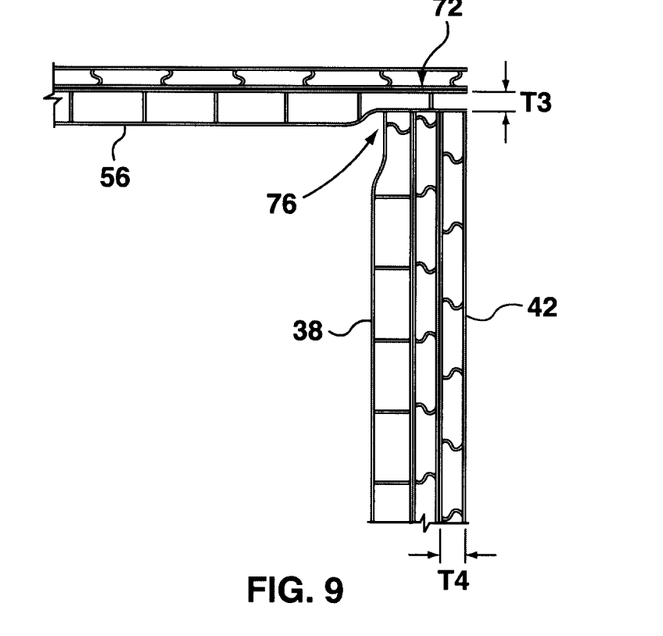
FIG. 9 is a fragmentary cross-sectional view along the lines labelled FIG. 9 in FIG. 6.
Figure 10:
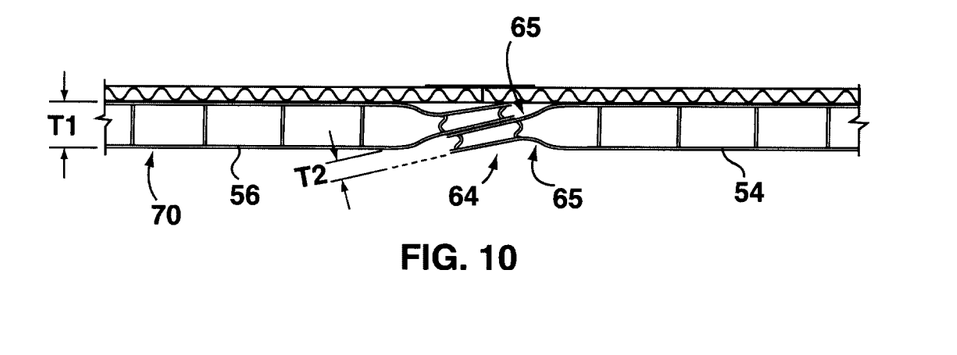
FIG. 10 is a fragmentary cross-sectional view along the lines labelled FIG. 10 in FIG. 7.

With reference to FIG. 10, the middle portion 70 of each of the flaps 54, 56 has a first thickness T1 which transitions at ramp surfaces 65 to a reduced thickness T2 within the side margins 64 of the flaps. As will be explained hereinafter, this results from crushing the inner 22 and outer 24 sheets of each flap toward each other along the side margins of the flap. The result is that the outer sheet the side margin of each flap is displaced from a plane of the outer sheet of the flap outside the side margin and the inner sheet of the side margin of the flap is displaced from a plane of the inner sheet of the flap outside the side margin. Moreover, with reference to FIG. 9, the end margins 72, 74 of the flaps have a reduced thickness T3. As will be explained hereinafter, this results from crushing the inner sheet 22 of each flap toward the outer sheet 24 of each flap.

With continued reference to FIG. 9, each outer end panel 42, 44, 46, 48 has a reduced thickness T4 resulting from crushing the inner 22 and outer 24 sheets toward one another. Reduced thickness T4 can be less than any of thicknesses T1, T2, or T3 and may be such that the outer end panels are essentially flattened. The free end of each medial end panel 38, 40 has a narrow reduced thickness band 76 resulting from crushing the inner sheet 22 toward the outer sheet 24 along this narrow band.

Figure 11:
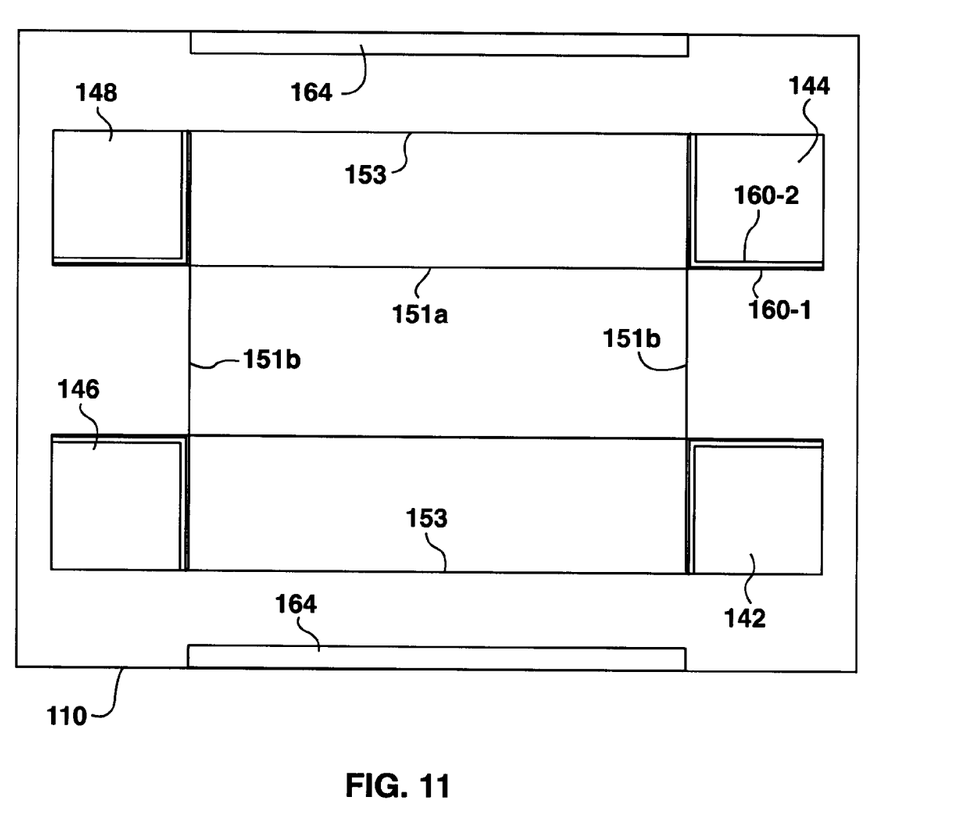
FIG. 11 is a top view of a bottom die for use in making the liner of FIG. 1.
Figure 12:
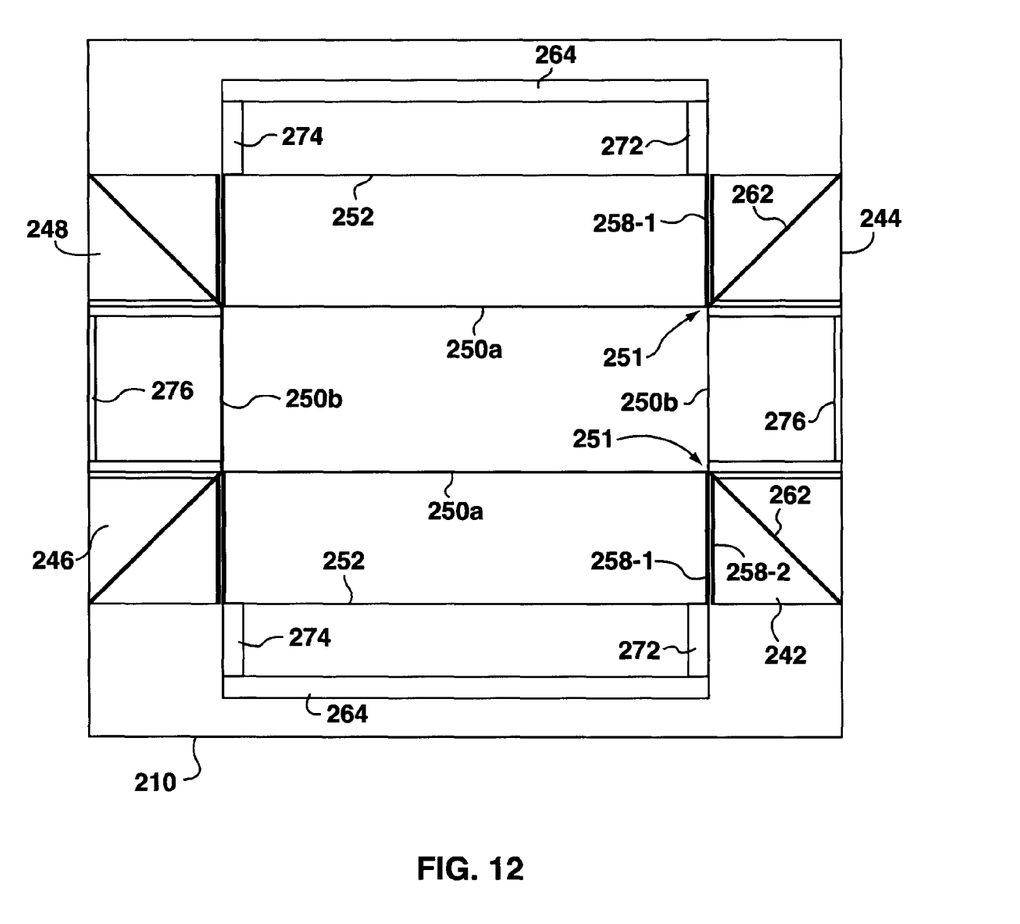
FIG. 12 is a bottom view of a top die for use in making the liner of FIG. 1.

FIG. 11 illustrates a bottom die and FIG. 12 a top die used to form liner blank 20. Turning to FIG. 11, bottom die 110 has raised square blocks 142, 144, 146, and 148 arranged such that they define corners of a notional rectangle. A creasing rule 160-1 extends along an inner edge of each raised square block 142, 144, 146, and 148. A creasing rule 160-2 extends within each raised square block parallel to, and proximate to, the rule 160-1 at the inner edge of the block. Each rule 160-2 extends from the outer end of a rule 160-1 to just shy of the inner end of the rule 160-1 (in fact, as far toward the inner end of rule 160-1 as possible without interfering with diagonal creasing rule 262 (FIG. 12) of the top die). A creasing rule 151a extends between blocks 144, 148 substantially in line with the creasing rules 160-1 which extend along the inner edge of blocks 144, 148 and a second such creasing rule 151a extends between blocks 142, 146 substantially in line with the creasing rules 160-1 which extend along the inner edge of blocks 142, 146. A creasing rule 153, parallel to linear grooves 150a, bridges blocks 144 and 148 in line with the outside edge of these blocks and a second creasing rule 153 bridges blocks 142 and 146 in line with the outside edge of blocks 144, 146. A raised rectangular block 164 outboard of each creasing rule 153 extends slightly beyond the length of each creasing rule 153 in parallel to the creasing rule 153. A creasing rule groove 151b extends between the inside edge of blocks 142, 144 and a second such creasing rule extends between the inside edge of blocks 146, 148.

Turning to FIG. 12, a top die 210 has raised square blocks 242, 244, 246, and 248 arranged such that they define corners of a notional rectangle. A creasing rule 250a extends between the innermost corner 251 of block 242 and the innermost corner of block 246. A second such creasing rule 250a extends between the innermost corners 251 of blocks 244 and 248. A creasing rule 250b extends between the innermost corner 251 of block 242 and the innermost corner 251 of block 244. A second such creasing rule 250b extends between the innermost corners of bocks 246 and 248. A diagonal rule 262 extends from the innermost corner 251 of each square block to an opposite corner of the block. A creasing rule 258-1 extends along an inner edge of each raised square block 242, 244, 246, and 248 substantially in line, with a creasing rule 150b. A creasing rule 258-2 extends within each raised square block parallel to, and proximate to, the rule 258-1. Each rule 258-2 extends from the outer end of the rule 258-1 to the diagonal rule 262. A creasing rule 252, parallel to rules 250a, bridges blocks 242 and 246 in line with the outside edge of these blocks and a second creasing rule 252 bridges blocks 244 and 248 in line with the outside edge of blocks 244, 248. A raised rectangular block 264 outboard of each creasing rule 252 extends slightly beyond the length of each creasing rule 252 parallel with the creasing rule 252. A raised rectangular block 272, perpendicular to rectangular block 264 extends from raised square block 242 to rectangular block 264. A second such raised rectangular block 272 extends from raised square block 244 to the second rectangular block 264. A raised rectangular block 274, perpendicular to rectangular block 264 extends from raised square block 246 to rectangular block 264. A second such raised rectangular block 274 extends from raised square block 248 to the second rectangular block 264. A raised band 276 extends between blocks 246 and 248 at the outboard side of blocks 246 and 248. A second raised band 276 extends between the outboard side of blocks 242 and 244.

Figure 13:
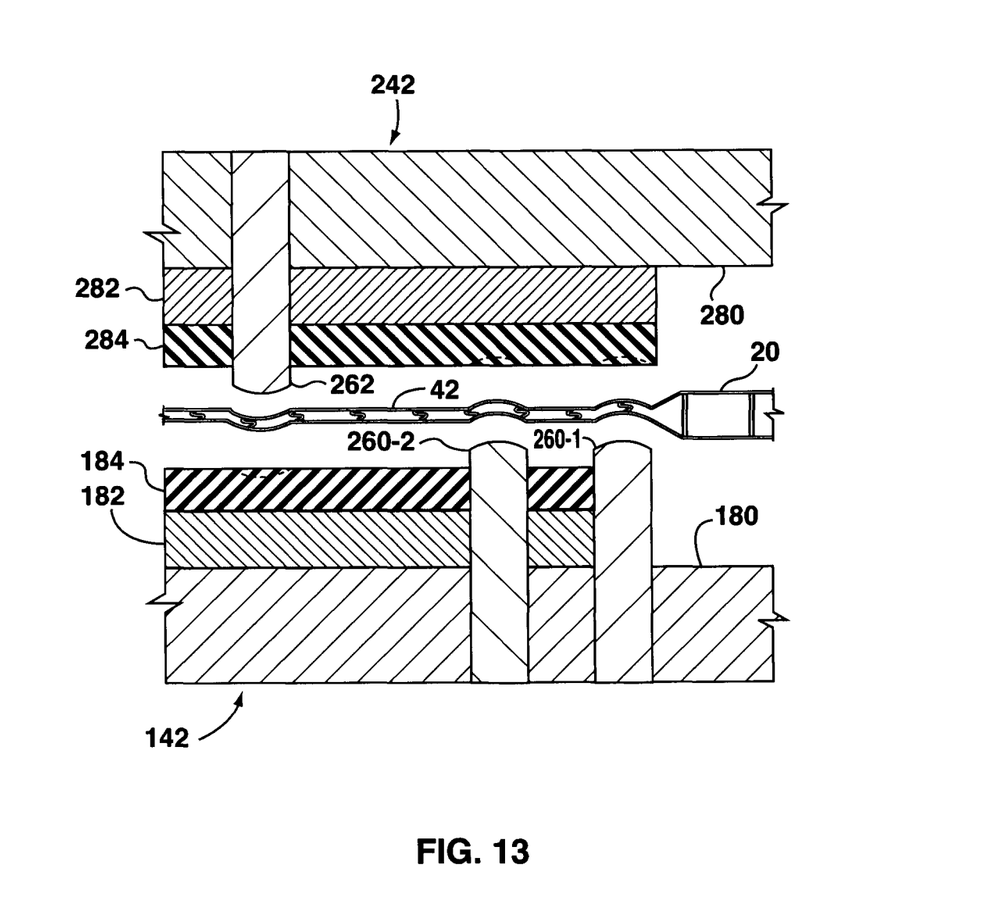
FIG. 13 is a fragmentary cross-sectional view of the dies in operation forming the liner blank of FIG. 1.

With reference to FIG. 13, each of the bottom and top dies may have a base 180, 280 of plywood or other rigid material. At each of the square blocks, as for example at square blocks 142, 242, the base may be surmounted by a rigid square plate 182, 282, respectively, formed of, for example, metal or a hard plastic such as LEXAN™. Each rigid square plate is in turn surmounted by a resilient square plate 184, 284, respectively which may be formed of pure gum rubber. Returning to FIGS. 11 and 12, at each of the raised rectangular blocks 164, 264, 272, 274, the base is surmounted by a rigid plate which, again, may be a metal or hard plastic plate. As illustrated in FIG. 13, the top of each creasing rule may be bevelled to facilitate folding of the liner blank at each creasing rule without binding.

To form a liner blank 20, a uniform sheet of material with an outline matching that of the liner blank of FIG. 1 is compressed between bottom die 110 and top die 210, which dies are oriented such that blocks 142, 144, 146, and 148 of the bottom die are registered with blocks 242, 244, 246, and 248 of the top die. This registers each creasing rule 250a of the top die with a creasing rule 151a of the bottom die so that, as the dies are brought together, the creasing rules 250a and 151a form inner creases 50a and outer creases 51a. In a similar fashion, inner creases 50b and outer creases 51b are formed. Each creasing rule 153 is aligned with a creasing rule 252 so that as the dies are brought together, inner and outer creases 52, 53 are formed in the liner. It will also be apparent that rectangular blocks 164, 264 of the dies partially crush the outside margins 64 of the liner flaps 54, 56 from both faces of the flaps. Because of the extent to which these margins of the flaps are crushed, a ramp surface 65 (FIGS. 1 and 2) naturally forms between the partially crushed side margin 64 of the flap and a portion of the flap inbound from the side margin. Furthermore, rectangular blocks 272, 274 partially crush the end margins 72, 74 of the flaps from the inner face of the flaps and bands 276 partially crush the edge of medial end panels 38, 40 from the inner face of these end panels. Also, the square blocks 142, 242, 144, 244, 146, 246, 148, 248 have a height sufficient to completely crush the outer end panels 42, 44, 46, 48 while the creasing rules 160-1, 160-2, 258-1, 258-2, and 262 form creases in these outer end panels. With reference to FIG. 13, it will be apparent that the pure gum rubber plates 184, 284 provide a resilient backstop to the creasing rules which crease the outer end panels to allow give and thereby avoid cutting the liner when forming the crease lines while crushing the outer end panels.

The described material for liner blank 20 has a significant rigidity in an uncrushed state. On the other hand, a certain amount of resilience is imparted to the material when partially crushed.

Figure 3:
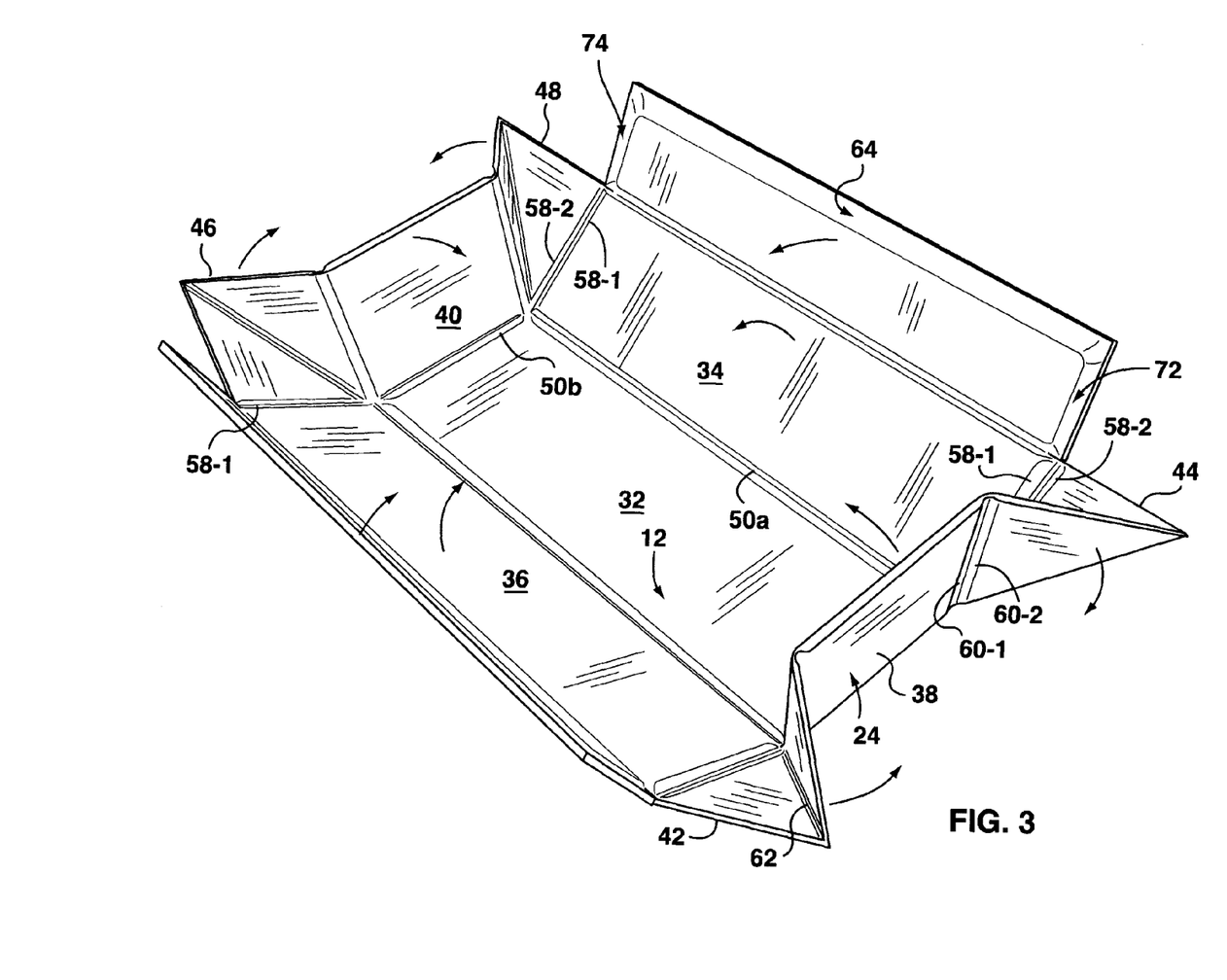
FIG. 3 is a top perspective view of the liner blank of FIG. 1 shown partially folded.
Figure 4:
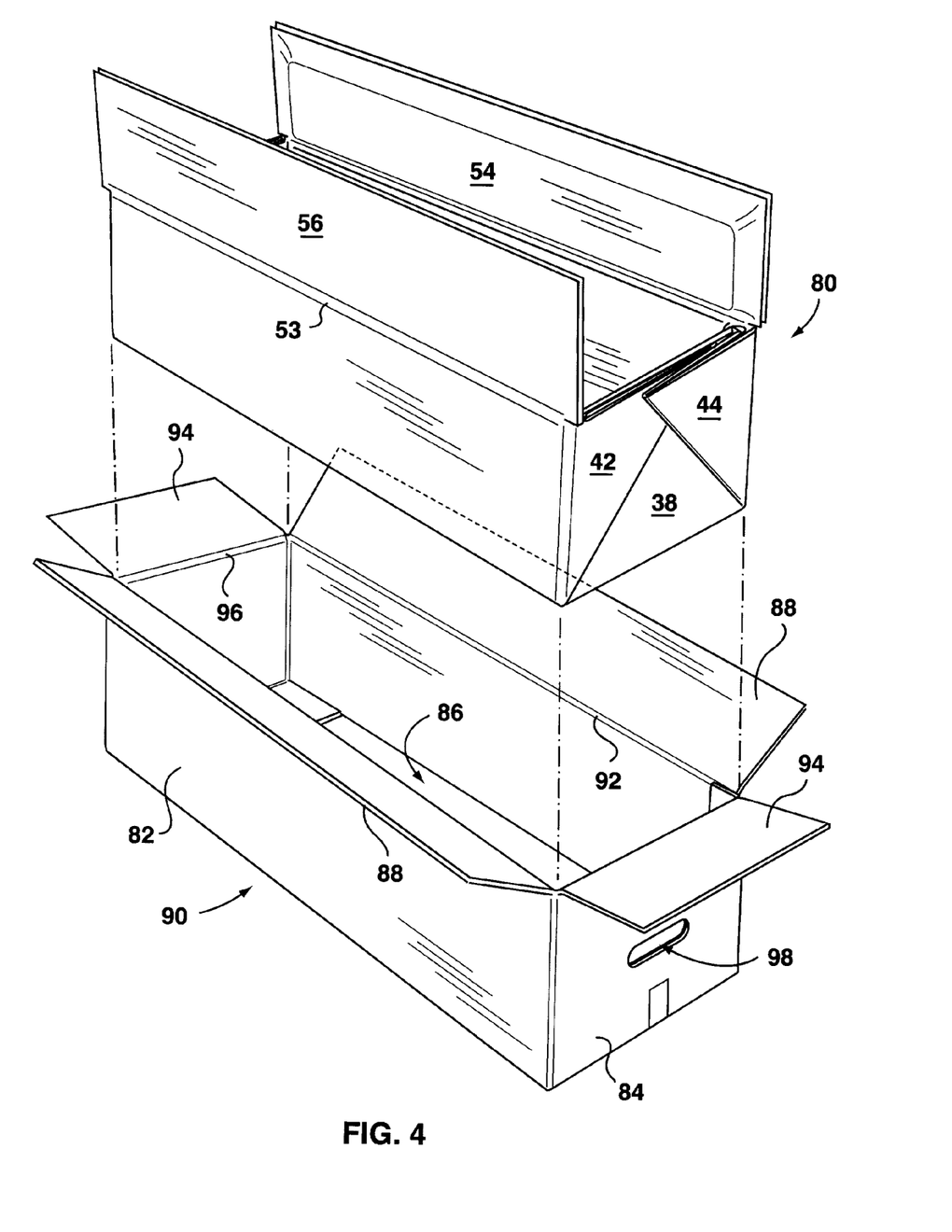
FIG. 4 is an exploded view of a thermal container made in accordance with this invention.
Figure 8:
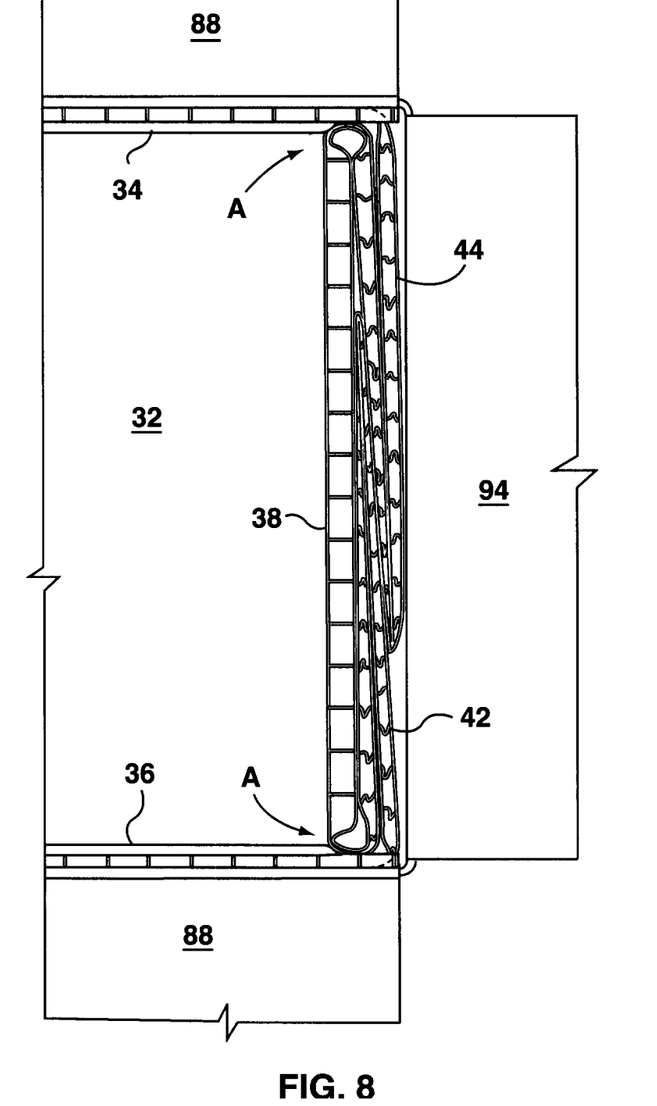
FIG. 8 is a fragmentary plan view of the container of FIG. 5 along the sight line indicated in FIG. 5.

FIGS. 3 and 4 show the progressive erection of liner blank 20 into a liner 80, with FIG. 3 illustrating the direction in which each panel is folded to erect the liner. As seen in FIG. 4, when erected, outer end panels 42, 44 of liner 80 are each folded in half behind medial end panel 38 and (while not seen in FIG. 4) outer end panels 46, 48 are folded each folded in half behind end panel 40 such that the liner 80 forms the shape of an open container body. This folding is facilitated by the crease lines. More particularly, crease lines 50b, 51b and interior crease line 58-1 allow the end panels 38, 42, 44; 40, 46, 48 to fold upwardly with respect to the bottom panel 32. Exterior crease lines 60-1 and interior diagonal crease lines 62 along with crease lines 50a, 51a allow the side panels 34, 36 to fold upwardly with respect to the bottom panel 32 while each outer end panel 42, 44 46, and 48 folds in half and swings outwardly. Each folded in half outer end panel may then be folded against the outer sheet 24 of its respective medial end panel 38, 40. In doing so, double crease line 60-1, 60-2 allows the fold at this double crease line to nestle into the fold at double crease line 58-1, 58-2. This result is best seen at areas A of FIG. 8. (While the liner has been described as being erected by first folding the end panels upwardly, equally the liner may be erected by first folding the side panels upwardly, or by folding the end and side panels upwardly simultaneously.) Because the outer end panels are flattened, the combined thickness of the medial end panel with the outer end panels folded against it is minimized. The exterior crease lines 51a, 51b facilitate folding of the liner without stress on the material thereby assisting in ensuring predictable fold lines with 90° corners.

It will be apparent from FIG. 4 that with the liner erected, the hinge lines 52, 53 of the flaps 54, 56 are in line with the top edge of the folded end panels 38, 40, 42, 44 46, and 48.

Figure 5:
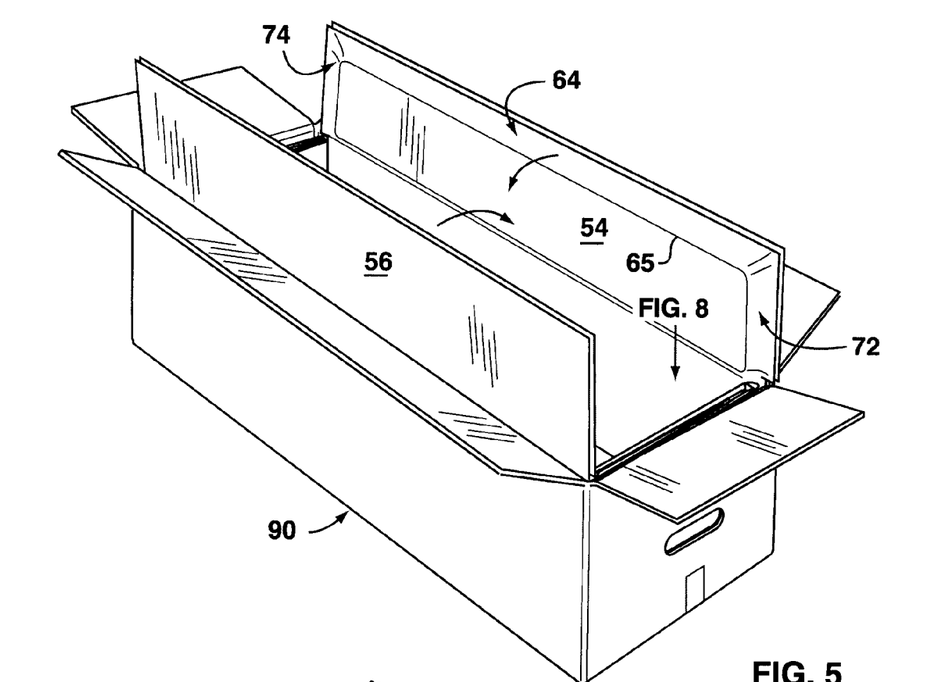
FIG. 5 is a perspective view of the container of FIG. 4 in an open configuration.

With reference to FIGS. 4 and 5, it will be apparent that the erected liner 80 may be slid into a box 90. The box, which may be fabricated of corrugate, has side walls 82, end walls 84, and a bottom wall 86 with a side flap 88 hinged to each side wall 82 at a hinge line 92 and an end flap 94 hinged to each end wall 84 at a hinge line 96. Each of the end walls has a cut out 98 to provide a hand grip. One nested in the box, the liner is held in an erected condition by the box. The liner 80 is sized such that after it is nested in the box, the crease lines 52, 53 between a liner side wall and side flap lie slightly above, at, or slightly below the level of box hinge line 92 and so that the top edge of the end panels at an end of the liner lie slightly above, at, or slightly below the level of box hinge line 96.

With the liner in place in the box, exterior crease lines 53 allow the flaps 54, 56 of the liner to be folded outwardly to increase the mouth size of the liner in order to facilitate loading.

Figure 6:
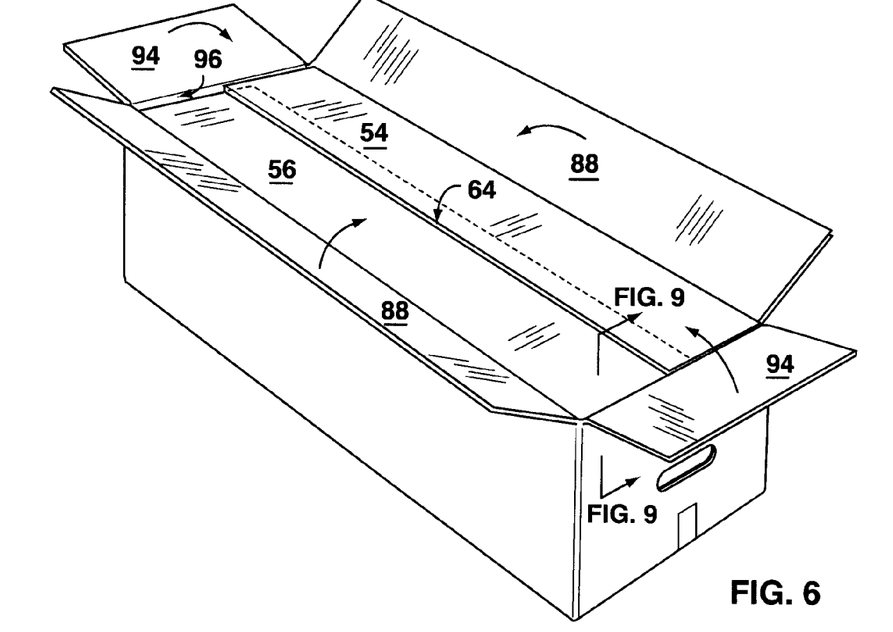
FIG. 6 is a perspective view of the container of FIG. 4 in a partially closed configuration.

After loading, flap 56, and then flap 54 may be folded down as shown in FIG. 6. The width of the flaps are chosen so that when the flaps are folded down, side margin 64 of flap 54 overlaps with side margin 64 of flap 56 with the outer edge of flap 54 abutting the ramp surface 65 along the inner sheet of flap 56 and the outer edge of flap 56 abutting the ramp surface 65 along the outer sheet of flap 54. Furthermore, the end margins 72, 74 of the flaps 54, 56 abut the top edges of the end panels 38, 40, 42, 44, 46, 48. With the side flaps 54, 56 folded closed atop the end panels, the outer sheet 22 of the flaps is slightly above the height of the hinge lines 92, 96 of the box.

Figure 7:
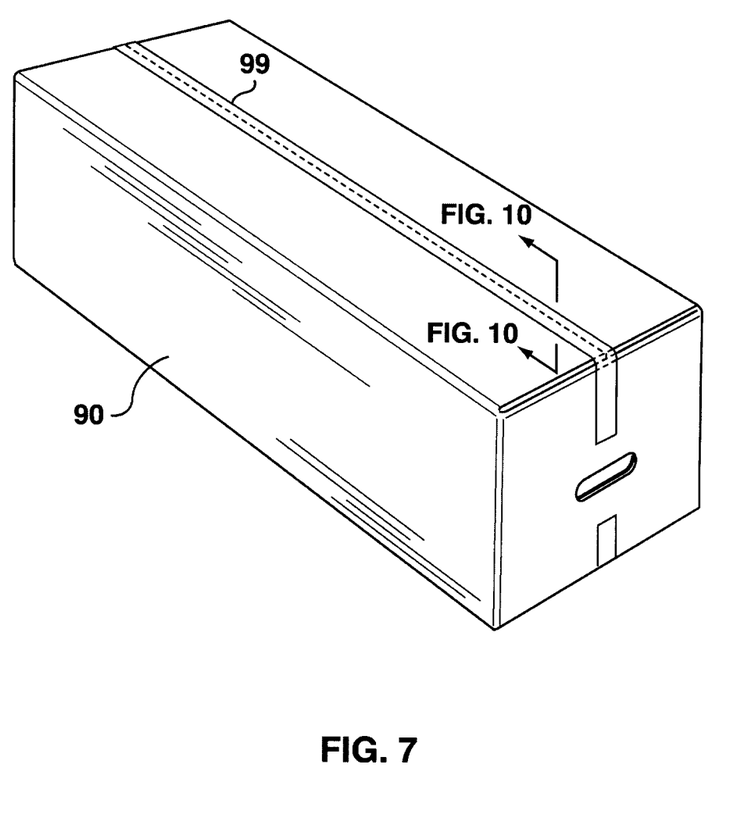
FIG. 7 is a perspective view of the container of FIG. 4 in a closed configuration.

Next the end flaps 94 of the box may be folded down. Because the top surface of the liner flaps 54, 56 extend above hinge lines 96, folding box end flaps 94 down will act to compress the end margins 72 of the liner flaps against the top edge of the liner end panels. It will also serve to compress overlapping side margins 64 of the liner flaps together and act to jam the outer edge of liner flap 54 into the ramp surface 65 along the outer sheet of liner flap 56 and the outer edge of flap 56 into the ramp surface 65 along the inner sheet of flap 54. Box side flaps 88 may then be folded down. This will further compress the end margins 72 of the liner flaps against the top edges of the liner end panels and will further compress the overlapping side margins of the liner flaps together and further jam the outer edge of each liner flap into the ramp surface of the other liner flap. As seen in FIG. 7, the box can then be taped closed by tape 99 to perpetually maintain this compression.

The partial crushing of the side margins 64 and end margins 72, 74 of the liner flaps 54, 56 impart a measure of resilience to these margins. Similarly, the pinching of the top edges of the medial end panels 38, 40 of the liner along narrow band 76 gives these top edges a measure of resilience. Further, the compression of outer end panels 42, 44, 46, 48 gives the top edge of these panels a measure of resilience. In consequence, any undulations in a side margin 64 of one liner flap are filled by the resilient side margin of the other liner flap thereby providing a good seal between the side margins of the liner flaps. Similarly, any undulations in the top edges of the end panels are filled with the resilient end margin of a liner flap thereby providing a good seal between the end margins of the liner flaps and the tops of the end panels.

The side margin of each liner flap is symmetrical because both the outer and inner sheets of the liner flap are compressed toward each other out of the plane of the flap in its T1 thickness area. In consequence, either flap 54 or flap 56 may be folded down first. In another embodiment, one flap is crushed only from its inner side and the other from its outer side. However, in such an embodiment, the flap crushed from its outer side must be folded down first.

The foil layer of the bottom sheet faces the interior of the liner when the container is closed and therefore reflects cold back into the liner. The foil layer of the top sheet faces the outside of the liner when the container is closed and therefore reflects heat away from the liner. In an alternate embodiment, only one foil layer is provided, facing the interior of the liner.

In an alternate embodiment, exterior crease lines 51a, 51b could be omitted but at the possible sacrifice of some predictability in the folds of the liner.

An advantage of the described material for the liner is that the honeycomb-shaped cells of the core are very stiff unless crushed. Therefore, the material is rigid in areas where it is not crushed. On the other hand, with the honeycomb cells crushed in certain areas of the material, these areas are resilient. These crushed areas are chosen to allow tighter seals when the liner is closed. Other materials could nevertheless be contemplated for the liner. For example, while not preferred, the liner may function with limited thermal properties if fabricated out of corrugate. (However, corrugate does not prevent heat transfer through conduction and convection.)

Other modifications will be apparent to those skilled in the art and, therefore, the invention is defined in the claims.

What is claimed is:

1. A thermal liner for a container comprising:
   a bottom panel,
   a pair of opposed end panels, each one being hinged to opposed edges of the bottom panel,
   a first side panel and an opposed second side panel, each one being hinged to opposed edges of the bottom panel and extending between the pair of end panels, and
   a first flap hinged to said first side panel at a first hinge line and a second flap hinged to said second side panel at a second hinge line, said first flap and said second flap sized so that they are moveable between an open position whereat said first flap is spaced from said second flap and a folded position whereat the first flap and the second flap extend substantially parallel to the bottom panel and a side margin of said first flap which extends along a side of said first flap opposite said first hinge line overlaps with a side margin of said second flap which extends along a side edge of said second flap opposite said second hinge line;
   each flap comprising an outer sheet and an inner sheet spaced by a core, an innermost layer of said inner sheet comprising a metal foil layer;
   each said flap having a first thickness outside said side margin and a second, reduced, thickness, within said side margin.

2. The liner of claim 1 wherein said first flap has a pair of end margins, each first flap end margin extending from an end edge of said first flap between said first hinge line and said side margin of said first flap and wherein said second flap has a pair of end margins, each second flap end margin extending from an end edge of said second flap between said second hinge line and said side margin of said second flap, each end margin having a third, reduced, thickness less than said first thickness.

3. The liner of claim 2 wherein said core comprises a repeating pattern of three dimensional paper structures extending between said outer sheet and said inner sheet.

4. The liner of claim 3 wherein said structures are honey-combed-shaped cells with paper walls extending transversely of said inner sheet and said outer sheet.

5. The liner of claim 3 wherein said paper structures are partially crushed within each said side margin and with each said end margin.

6. The liner of claim 2 wherein said outer sheet of said first flap within said side margin of said first flap is displaced from a plane of said outer sheet of said first flap within a first thickness portion of said first flap and wherein said inner sheet of said first flap within said side margin of said first flap is displaced from a plane of said inner sheet of said first flap within said first thickness portion of said first flap.

7. The liner of claim 6 wherein said outer sheet of said first flap within each said end margin of said first flap is in a plane of said outer sheet of said first flap within first thickness areas of said first flap and wherein said inner sheet of said first flap within said end margin of said first flap is displaced from a plane of said inner sheet of said first flap within first thickness areas of said first flap.

8. The liner of claim 1 wherein said core comprises a series of paper walls extending transversely of said inner sheet and said outer sheet between said inner sheet and said outer sheet.

9. The liner of claim 1 wherein said first hinge line comprises a concave crease extending along said inner sheet and a concave crease extending along said outer sheet.

10. The liner of claim 1 wherein each said end panel comprises a medial end panel hinged to said bottom panel, a first outer end panel hinged to said first side panel by a side panel pair of parallel hinge lines and a second outer end panel hinged to said second side panel by a side panel pair of parallel hinge line and hinged to said medial end panel by a medial end panel pair of parallel hinge lines.

11. The liner of claim 10 wherein each pair of parallel hinge lines is spaced by about said first thickness.

12. The liner of claim 10 wherein said inner sheet and said outer sheet extend across said end panels and wherein each hinge line of said side panel pair of parallel hinge lines comprises a concave crease extending along said inner sheet and wherein each hinge line of said medial end panel pair of parallel hinge lines comprises a concave crease extending along said outer sheet.

13. The liner of claim 12 wherein said first outer end panel has a diagonal crease extending along said inner sheet from a point approximately where said side panel pair of parallel hinge lines of said first outer end panel and said medial end panel pair of parallel hinge lines of said first outer end panel meet to a free corner of said first outer end panel and wherein said second end panel has a diagonal crease extending along said inner sheet from a point approximately where said side panel pair of parallel hinge lines of said second outer end panel and said medial end panel pair of parallel hinge lines of said first second end panel meet to a free corner of said second outer end panel.

14. The liner of claim 10 wherein said first outer end panel has a thickness less than said first thickness and said second outer end panel has a thickness less than said first thickness.

15. The liner of claim 1 wherein an outermost layer of said outer sheet comprises a metal foil layer.

16. The liner of claim 1 wherein said second thickness is approximately one-half said first thickness.

17. The liner of claim 1 further comprising a ramp surface at an inner limit of said side margin of each of said first flap and said second flap, said first flap and said second flap sized so that, in said folded position, a free edge of said side margin of one of said first flap and said second flap and said second flap abuts said ramp surface of another of said first flap and said second flap.

18. A thermal container comprising:
   a liner bottom panel,
   a pair of opposed liner end panels, each one being hinged to opposed edges of the bottom panel,
   a first liner side panel and a second opposed liner side panel, each one being hinged to opposed edges of the bottom panel and extending between the pair of end panels, and
   a first liner flap hinged to said first liner side panel at a first hinge line and a second liner flap hinged to said second liner side panel at a second hinge line, said first liner flap and said second liner flap sized so that they are moveable between an open position whereat said first liner flap is spaced from said second liner flap and a folded position whereat the first flap and the second flap extend substantially parallel to the bottom panel and a side margin of said first liner flap which extends along a side of said first liner flap opposite said first hinge line overlaps with a side margin of said second liner flap which extends along a side edge of said second liner flap opposite said second hinge line;

each liner flap comprising an outer sheet and an inner sheet spaced by a core, said inner sheet comprising a metal foil layer;

each said liner flap having a first thickness outside from said side margin and a second, reduced, thickness, within said side margin;

said liner sized so that when said liner flaps are closed, a top surface of said liner flaps projects approximately to a top edge of said container side walls and said container end walls.

* * * * *